United States Patent [19]

Aiken et al.

[11] Patent Number: 5,277,587

[45] Date of Patent: Jan. 11, 1994

[54] LEARNING TOY

[75] Inventors: Brian L. Aiken, Orlando, Fla.; Dominick Loscalzo, Whitestone; Anthony J. Barsanti, New York, both of N.Y.

[73] Assignee: Dart Industries Inc., Deerfield, Ill.

[21] Appl. No.: 945,200

[22] Filed: Sep. 15, 1992

[51] Int. Cl.⁵ .................................................. G09B 3/00
[52] U.S. Cl. .................................... 434/333; 434/191; 434/199; 434/327; 40/447
[58] Field of Search ............... 434/191, 202, 199, 327, 434/331, 333, 345, 348; 446/8; 40/447, 490

[56] References Cited

U.S. PATENT DOCUMENTS

| | | | |
|---|---|---|---|
| 1,666,337 | 4/1928 | McDade | 434/199 |
| 2,693,646 | 11/1954 | Hawkins . | |
| 3,154,863 | 11/1964 | La Prelle . | |
| 3,359,651 | 12/1967 | Mair | 434/331 |
| 3,535,796 | 10/1970 | Dean . | |
| 3,714,721 | 2/1973 | Tilley . | |
| 3,828,720 | 8/1974 | Herst | 40/447 |
| 4,307,534 | 12/1981 | Tomita | 434/372 X |
| 4,728,294 | 3/1988 | Bredehorn | 434/327 |
| 4,770,638 | 9/1988 | Jabour et al. . | |
| 4,836,783 | 6/1989 | Harper | 434/87 |
| 4,921,427 | 5/1990 | Dunn . | |

Primary Examiner—Gene Mancene
Assistant Examiner—L. Thomas
Attorney, Agent, or Firm—John A. Doninger

[57] ABSTRACT

A learning device including a holder having a storage area and a display area. Information cards including a problem and a coded solution are selectively introduced into the display area wherein the problem remains visible and the coded answer is viewed through one or more specifically configured openings which combine with the coded answer to provide a deciphered or readable answer.

11 Claims, 3 Drawing Sheets

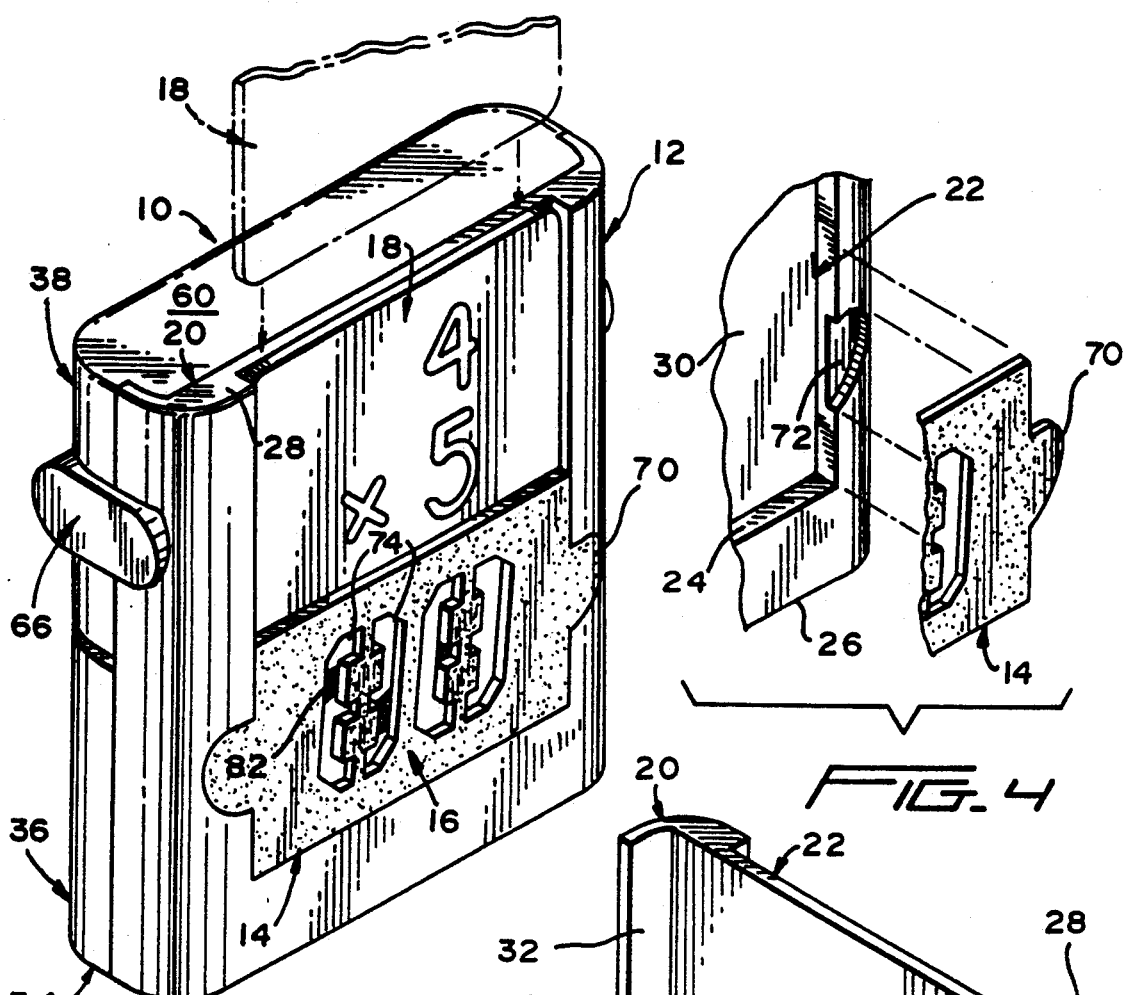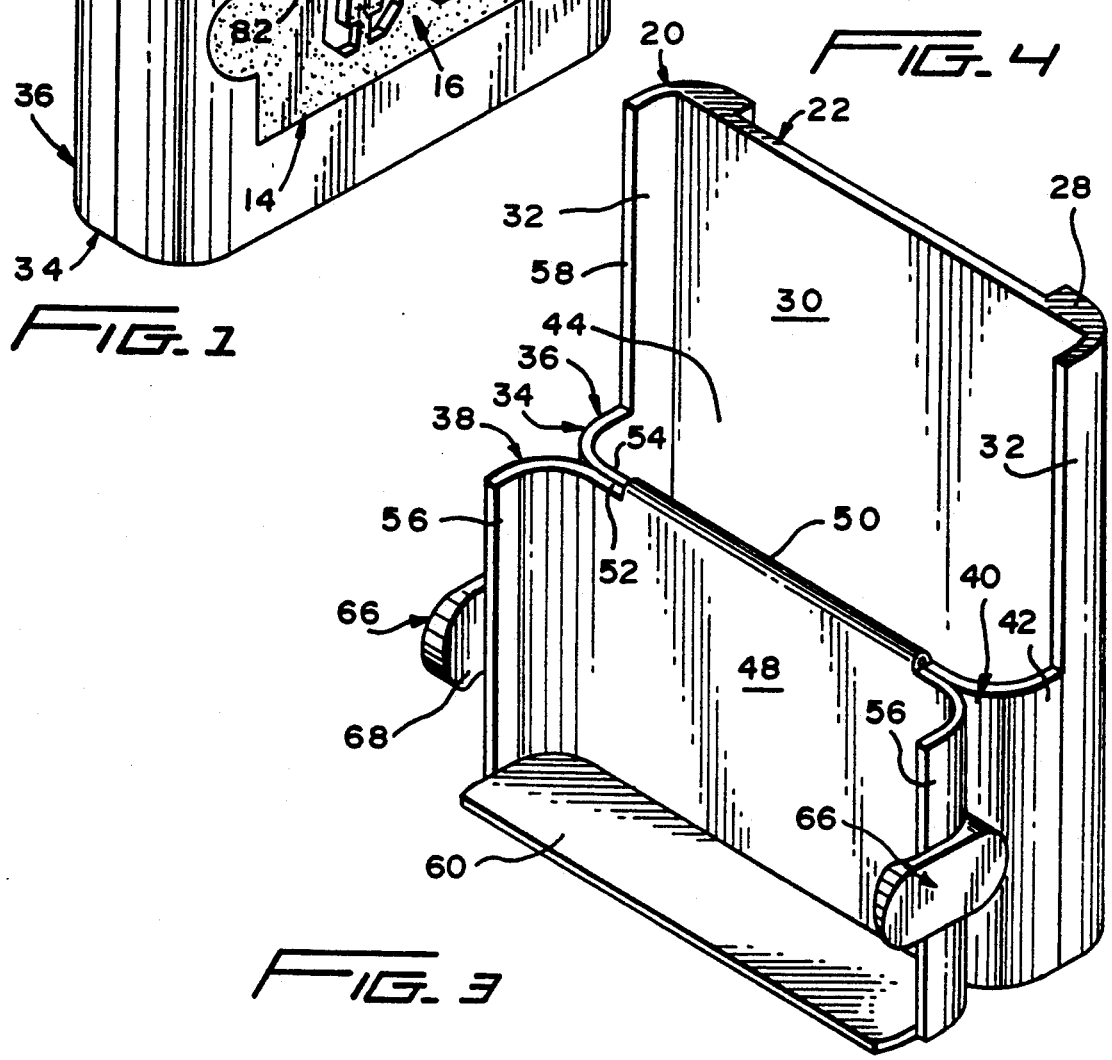

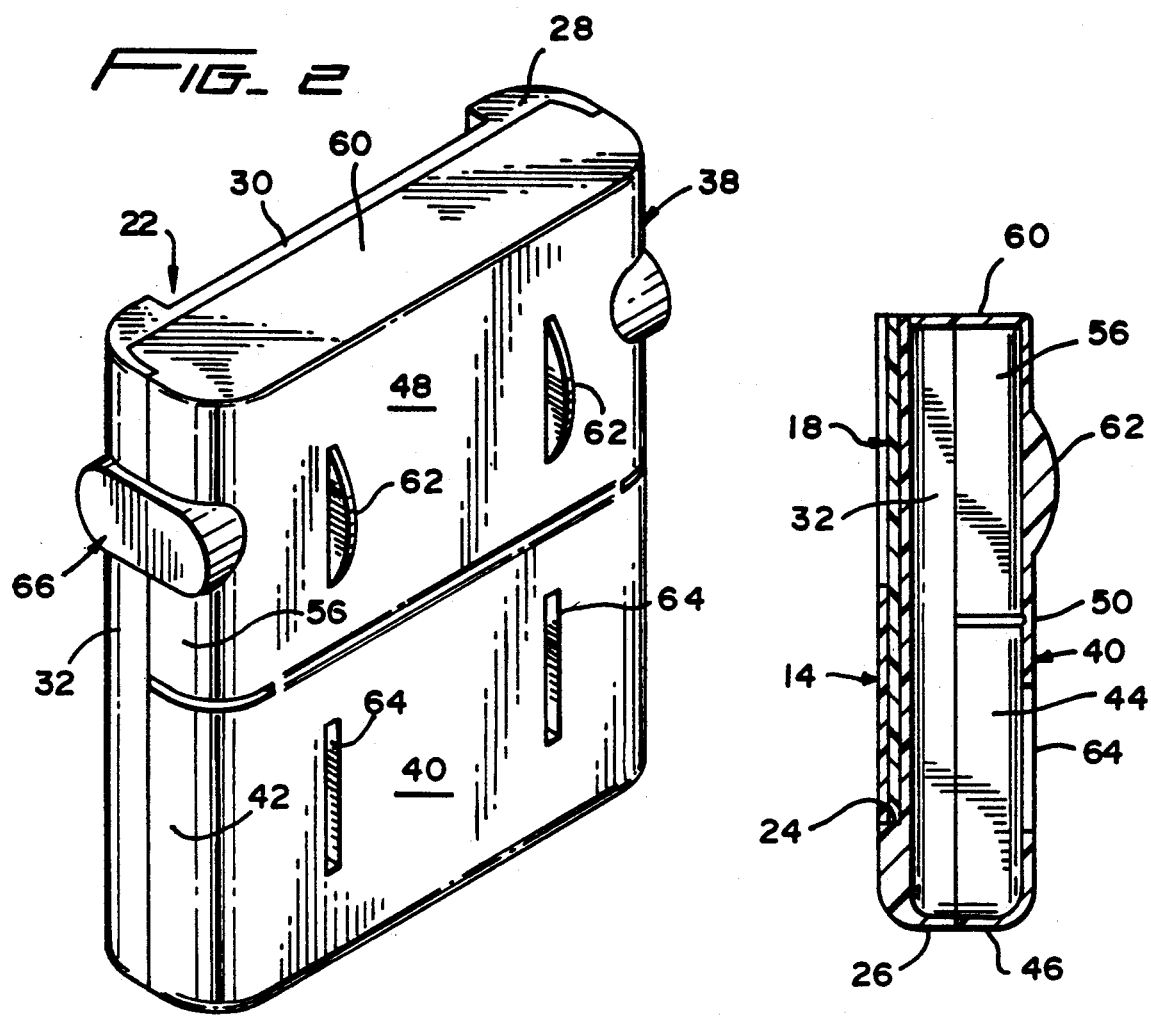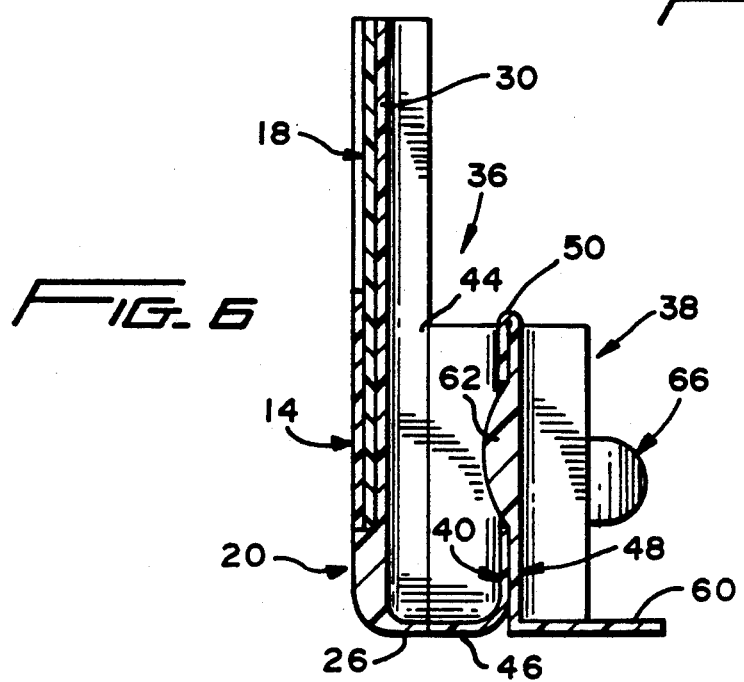

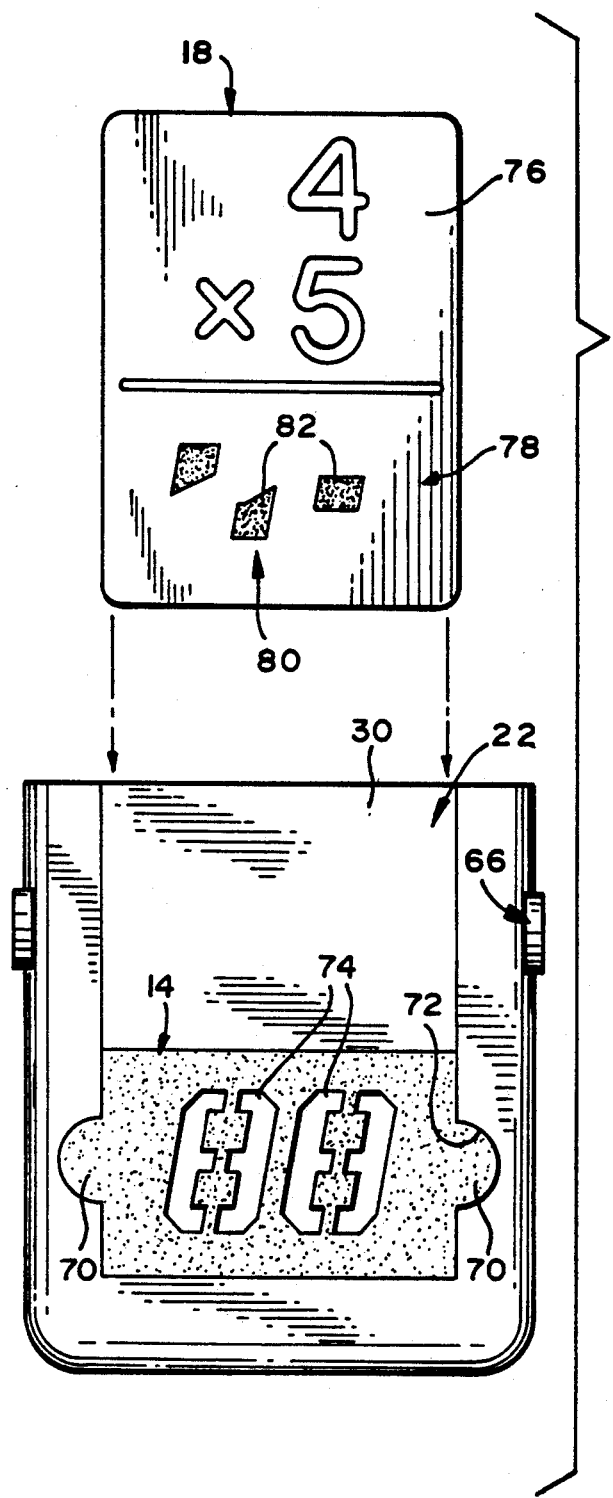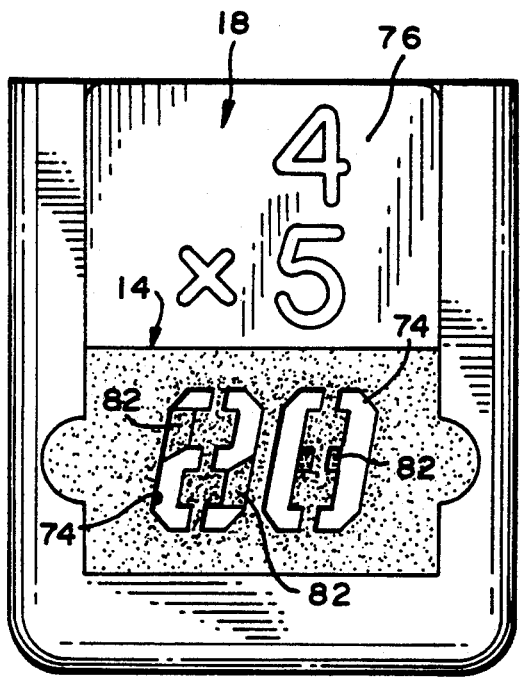

LEARNING TOY

BACKGROUND OF THE INVENTION

Educational aids, particularly for the younger student, are frequently presented in the form of a toy, thereby enhancing the attraction of the device and presenting a challenge more readily accepted by the child.

A common form of such a device is the flash card, a card normally incorporating a question, problem or other challenge, and a solution, preferably concealed in some obvious manner, for example by appearing on the opposite face of the card.

The provision of the answer on the same card as the problem gives rise to the possibility of an accidental premature disclosure of the answer, particularly if the child directly handles the card, either as a self-learning situation or for a better viewing of the problem.

Variations of the basic flash cards are also known and can vary from simple to complex systems. As an example, the patent to Jabour et al, 4,770,638, issued Sep. 13, 1988, discloses a system wherein the face of the card includes both the question and the answer with the card positioned within a display means which conceals that portion of the card which presents the answer, thus displaying only the question until such time as the card is removed from the display device.

A more complex system is illustrated in La Prelle, 3,154,863, issued Nov. 3, 1964 which provides separate question and answer cards with an alignment and color code system used as a means to signal a correct match of the answer to the question.

SUMMARY OF THE INVENTION

The present invention comprises a learning toy utilizing cards which display, on one face thereof, both the problem or question and the answer or solution. The answer, however, is coded or unreadable until such time as it is viewed through a viewing window incorporating deciphering means. As such, the learning toy also preferably incorporates a holder which, after the individual card is reviewed by the child or student, receives the card in a manner which positions the coded answer for viewing through the deciphering viewing window. At the same time, the problem remains exposed for simultaneous viewing with the now exposed answer.

The holder is in the nature of a storage case for the storing of multiple cards with the cards selectively withdrawn for individual use. The holder is also particularly adapted for use as a stand or free standing display device.

The viewing window removably mounts to the holder and combines therewith in defining a compartment for reception of the single card to be viewed. Multiple interchangeable viewing windows are contemplated with the use of a particular viewing window, and in particular the deciphering opening or openings therein being determined by the nature of the cards and the coded answers thereon. The deciphered answers can appear in any appropriate form, for example as numerals for math problems, or words or letters for word problems, or any combination thereof.

As an example, in a mathematics situation the viewing window, assuming no more than two digit answers, can provide for two deciphering opening arrays. In word puzzles, for example requiring identification of pictures of common items such as an apple or a house, the viewing window can present multiple deciphering openings which, when underlaid with the coded answer corresponding to the particular illustrated item, will present a visual display of the name of the item, for example "house" or "apple".

It is to be appreciated that while the invention has been referred to as a learning toy, this general designation is to encompass all types of challenge means wherein a question or problem is proposed and a coded response presented. As such, the device will also be particularly adapted for quiz games, competitions, testing means and the like.

Additional features, objects and advantages of the invention are considered to reside in the details of construction and manner of use of the invention as more fully hereinafter set forth.

BRIEF DESCRIPTION OF THE DRAWINGS

FIG. 1 is a front perspective view of the learning toy of the invention;

FIG. 2 is a rear perspective view of the learning toy;

FIG. 3 is a rear perspective view of the learning toy with the storage chamber open and the chamber cover positioned to provide a stand;

FIG. 4 is an exploded perspective detail illustrating the mounting of the window panel;

FIG. 5 is a vertical cross-sectional view through the learning toy;

FIG. 6 is a vertical cross sectional view through the learning toy with the storage chamber open;

FIG. 7 is an exploded elevational view of the front of the learning toy and an information card aligned therewith for insertion therein; and FIG. 8 is a front elevational view of the learning toy as in FIG. 7 with the information card inserted therein and the coded answer deciphered.

DESCRIPTION OF THE PREFERRED EMBODIMENTS

Referring now more specifically to the drawings, the learning toy 10 includes a holder or display case 12, a panel 14 with a viewing window 16 defined therein, and a series of information cards 18. The panel 14 is preferably removably mounted to the holder 12 and interchangeable with similar panels having different viewing windows 16 coordinated with different sets of information cards 18 in accord with the information thereon as shall be explained subsequently.

The holder 12 includes a forward section 20, preferably of rectangular vertically elongate configuration with a forwardly directed rectangular recess formed therein and defining a compartment 22 for selective reception of the information cards.

The compartment 22 extends from a bottom edge or ledge 24, vertically spaced above the base 26 of the forward section 20, and opens vertically upward through the top wall 28 of the forward section 20. The inner face of the compartment 22 is defined by an inner wall 30. The opposed vertical edges or sides of the forward section 20 comprise rearwardly directed flanges 32 defining rounded vertical corners at the front face of the forward section and projecting rearwardly beyond the rear wall 30.

The rear section of the holder 12, generally designated by reference numeral 34, includes a lower pocket-defining portion 36 and an upper cover or closure defining portion 38, each of substantially one-half the total height of the holder 12.

The lower portion 36 includes a back wall 40 and a pair of opposed vertical forwardly directed side flanges 42 formed along vertical arcuate edges with the back wall 40 and extending therefrom for edge joinder to the rear edges of the rearwardly directed side flanges 32 of the forward section 20 whereby a card-receiving chamber 44 of a width approximately equal to the combined widths of the corresponding flanges 32 and 42 is defined.

The lower portion 36 also includes an integral bottom wall 46 which extends inwardly or forwardly from the back wall 40 for the full width of the side flanges 42 and which joins the rear edge of a similar rearwardly extending bottom wall on the forward section 20 which comprises the aforementioned base 26.

As suggested in the drawings, the forward and rear sections 20 and 34 are, as a manufacturing expedient, normally molded separately and subsequently permanently joined along the corresponding edges of the aforedescribed flanges and bottom walls. Alternatively, the side and bottom walls of the forward section and lower portion of the rear section can be formed by other techniques, for example as an integral molding.

The cover or upper portion 38 of the rear section 34 is generally of the same configuration as the lower portion 36 to define, in the closed position, a compact and streamlined configuration as best seen in FIG. 2. As such, the cover 38 includes a back wall 48 hinged, preferably by an integral molded living hinge 50, along its lower edge 52 to the corresponding upper edge 54 of the lower portion back wall 40. The opposed edges of the upper portion 38 are defined by forwardly directed flanges 56 corresponding in shape and width to the lower portion flanges 42 and, in the closed position of the cover 38, abutting against the rear edges 58 of the flanges 32 of the forward section 20, thus defining side walls and in effect extending the storage chamber 44 for the full height of the holder 12.

The cover 38 includes a top panel or wall 60 which extends forwardly from the upper edge of the back wall 48 beyond the forward edges of the side flanges 56 a distance equal to the width of the forward section side flanges 32 so as to abut with the rear surface of the forward section vertical wall 30 in the plane of the top wall 28 of this forward section simultaneously with an abutment of the side flanges 56 and 32 to define a complete end closing of the chamber 44.

Noting FIGS. 3 and 6 in particular, the height of the back wall 48 of the cove is equal to that of the back wall 40 of the lower chamber defining section 36 whereby upon an opening of the cover 38 and a movement of the cover to its fully opened position depending from the hinge 50, the top wall 60 of the cover 38 is coplanar with the bottom walls 26 and 46 to define therewith a wide flat support base or stand for a free standing of the holder or display case, normally during use.

In order to releasably fix the cover 38 in its open stand-defining position, the back wall 48 of the cover includes a pair of rearwardly projecting arcuate projections 62 which, upon a full opening of the cover 38, are frictionally and releasably retained within a complementary pair of slots 64 defined through the back wall 40 of the lower portion 36 of the rear section 34.

In order to releasably retain the cover 38 in its closed position, a pair of gripping arms 66 are integrally molded with the opposed side wall flanges 56 of the cover 38 and extend sufficiently forward thereof so as to overlap the side wall flanges 32 of the forward section 20, extending forwardly thereof to partially wrap about the arcuate vertical joinder edge between each flange 32 and the forward face of the forward section 20. The inner face 68 of each of these arms 66, forward of the corresponding cover flange 56 is slightly concave to conform to the forward section flanges 32 and corresponding arcuate vertical edge. The engagement of the arms 66 as the cover 38 is closed is, in effect, a releasable snap locking resulting from a slight flexing of the arms or corresponding side wall flanges made possible by an inherent flexible resiliency in the material of the display device. It is contemplated that the cover 38, when closed, will require a positive manual manipulation for release, thus avoiding any possibility of the cover accidentally opening.

Turning now to the display aspect of the learning toy 10, the viewing window panel 14 is received within the lower portion of the recess or compartment 22, preferably engaging the bottom edge 24 thereof and extending vertically therefrom to less than the full height of the recess, and to a height in accord with the nature of the information cards 18 to be used in conjunction therewith. The panel 14 is of a thickness substantially less than the depth of the compartment 22 whereby upon a positioning of the panel 14 to be flush or coplanar with the forward face of the forward section 20, a pocket is defined behind the mounted panel 14 which, in conjunction with the exposed portion of the compartment 22 above the panel 14 provides a reception slot for the cards 18.

In order to releasably retain the viewing window panel 14, the panel 14 is provided, along the opposed vertical edges thereof, with a pair of laterally projecting arcuate mounting extensions or lugs 70 which are frictionally received within complementarily configured notches in the front face of the forward section 20 to the opposite sides of the central compartment 22. The notches 72, as best noted in FIG. 4, are of a depth substantially less than the depth of the recess or compartment 22 so as to properly position the panel 14 forward of the inner wall 30 for a retention of the card retaining pocket therebehind. It will also be appreciated that the depth of the notches 72 corresponds to the thickness of the panel 14 whereby a flush appearance is retained. Removal of the panel 14 can be easily effected by a grasping of the exposed upper edge thereof, particularly if no information card 18 is present therebehind. The frictional engagement of the extensions 70 and notches 72 is such as to allow ready removal and replacement, while at the same time affording sufficient integrity as to prevent accidental displacement of the panel 14 during the insertion and removal of the information cards 18 as the display device is used.

The viewing window 16 is defined by one or more openings 74 which comprise a means for deciphering a coded answer on an information card 18 positioned therebehind. The information card 18, on one face thereof, includes an upper problem or challenge area 76 and a lower answer or solution area 78. The size and orientation of the problem area 76 is such as to be completely exposed within the compartment 22 above the window panel 14. The solution area, in turn, is of a size and configuration to be received within the lower portion of the compartment 22 behind the window panel. The problem or challenge presented in the problem area 76 can be a basic mathematical problem as illustrated, a word which requires translation, a picture, for example a house, which requires word identification, or any of a myriad of like presentations.

The answer area 78 will include the coded answer 80 in the nature of one or more distinctive FIGS. 82, which, by direct observation, cannot be read or interpreted without being deciphered.

It is the purpose of the viewing window 16 to provide a means for deciphering the coded answer 80. As such, the viewing window 16 has the opening or openings 74 therein so configured whereby upon a positioning of what appears to be the random code forming FIGS. 82 therebehind, a readable combined appearance is presented which visually and in a clear manner sets forth the deciphered answer to the problem. Noting the illustrated example in FIGS. 7 and 8 in particular, the deciphering means consists of two sets of openings 74 each set presenting a basic FIG. 8 display which is quite similar to the conventional seven segment arrangement commonly seen in LED digital displays in electronic devices wherein a selected blanking of portions of the display result in the presentation of a range of numbers from 0 to 9. In the illustrated example, the coded answer FIGS. 82 combine with the two sets of openings to visually present the number 20, the proper solution of 4×5. In order to make the answer more clearly readable, it is proposed that the face of the viewing window panel 14 and the face of the answer FIGS. 82 be similarly colored or presented in a manner readily distinguishable from the remainder of the face of the answer area 78 of the information card 18. This has been represented by a stippling effect in the drawings.

The nature or configuration of the solution deciphering openings 74 will be determined by the nature of the visual answer desired, and will complement, toward this end, the nature and arrangement of the coded answer FIGS. 82. For example, while the basic "visual" display illustrated is sufficient for numeric answers, an answer in the nature of a word, particularly of several letters such as "apple" in response to the presentation of a picture of an apple in the problem area, will require a string of openings along the viewing window panel for cooperation with the string of coded answer figures which together define the solution word "apple". If the deciphered answer is to comprise recognizable figures or pictures, this will require yet another opening display as the deciphering means.

As will be recognized, both sides of each information card 18 can be utilized, providing an upper problem area and a lower solution area. Similarly, while the problem and deciphered solution have been presented as visually recognized indicia, it is possible to provide for a tactile reading of the problem and solution.

The foregoing is considered illustrative of the principles of the invention. As variations and changes may occur to those skilled in the art, it is not desired to limit the invention to the exact construction and manner of use shown and described. Rather, the invention is to only be limited by the scope of the claims following hereinafter.

We claim:

1. A learning device comprising a holder, a viewing window on said holder, a compartment in said holder underlying said viewing window, an information means presenting a challenge and a coded response, said information means being selectively received in said compartment for at least partial viewing through said viewing window, said viewing window including means for deciphering said coded response upon a viewing of said coded response through said viewing window, said holder including a storage chamber rearward of said compartment said holder further including cover means mounted for movement between a first position closing said storage chamber and a second position defining a means for forming a stand for said holder.

2. The learning device of claim 1 including a panel, said viewing window being defined in said panel and comprising at least one opening through said panel, said at least one opening defining said means for deciphering said coded response, said coded response aligning with said at least one opening upon reception of said information means in said compartment, and obscuring at least one portion of said at least one opening whereby the remainder of said at least one opening defines a deciphered response to said challenge.

3. The learning device of claim 2 wherein said panel has a forward viewing face with a predetermined effect thereon, said coded response having a similar effect thereon whereby upon an alignment of said coded response with said at least one opening through said panel a continuous effect between said panel viewing face and said coded response is presented which is readily distinguishable from the remainder of said at least one opening which defines the deciphered response.

4. The learning device of claim 3 wherein said continuous effect is visually distinctive.

5. The learning device of claim 4 wherein said information means comprises a card with a face surface having both said challenge and said coded response thereon.

6. The learning device of claim 5 wherein said panel is replaceable, and said device further including means for releasably mounting said panel to said holder.

7. The learning device of claim 1 including means for releasably retaining said cover means in said first chamber-closing position, and means for releasably retaining said cover means in said second stand-forming position.

8. A learning device comprising a holder, a viewing window on said holder, a compartment in said holder underlying said viewing window, an information means presenting a challenge and a coded response, said information means being selectively received in said compartment for at least partial viewing through said viewing window, said viewing window including means for deciphering said coded response upon a viewing of said coded response through said viewing window, said device including a panel, said viewing window being defined in said panel and comprising at least one opening through said panel, said at least one opening defining said means for deciphering said coded response, said coded response aligning with said at least one opening upon reception of said information means in said compartment, and obscuring at least one portion of said at least one opening whereby the remainder of said at least one opening defines a deciphered response to said challenge, said compartment being defined as a recess in said holder, said panel extending across a portion of said compartment and defining a pocket therebehind, and said device further including means for releasably retaining said panel on said holder for selective replacement, said means releasably retaining said panel comprising integral projecting extensions on said panel and complementary notches in said holder frictionally receiving said extensions.

9. A learning device comprising a holder, window means on said holder, a compartment in said holder underlying said window means, an information means presenting a challenge and a coded response, said information means being selectively received in said compartment for at least partial viewing through said window means, said window means including means for deciphering said coded response upon a viewing of said coded response through said window means, said device including a panel, said window means being defined in said panel, said coded response aligning with said window means upon reception of said information means in said compartment, and obscuring at least one portion of said window means whereby the remainder of said window means defines a deciphered response to said challenge, said compartment being defined as a recess in said holder, said panel extending across a portion of said compartment and defining a pocket therebehind, and said device further including means for releasably retaining said panel on said holder for selective replacement, said means releasably retaining said panel comprising integral projecting extensions on said panel and complementary notches in said holder frictionally receiving said extensions.

10. A learning device comprising a holder having a top, a bottom, a forward section and a rear section, a forwardly opening compartment in said forward section, said compartment also opening upwardly through said top, an information means presenting a challenge and a coded response, said information means being selectively received in said compartment through said top, a viewing window across said compartment below said top for at least partial viewing of said information means through said viewing window, said viewing window including means for deciphering said coded response upon a viewing of said coded response through said viewing window, said holder including a storage chamber in said rear section rearward of said compartment, said storage chamber opening rearwardly relative to said rear section and upwardly through said top, said rear section including a back wall extending upward from said bottom and terminating in an upper edge spaced below said top, said rear section further including cover means mounted to said back wall for movement between a first closed position overlying and closing said chamber and a second open position depending below said upper edge of said back wall and means for releasably retaining said cover means in said first closed position, and means for releasably retaining said cover means in said second open position.

11. The learning device of claim 10 wherein said means for releasably retaining said cover means in said open position comprises frictionally engageable projection means and slot means alternately on said cover means and said rear section back wall, said projection means frictionally and releasably engaging in said slot means as said cover means moves into said open position.

* * * * *